United States Patent
Auer et al.

(10) Patent No.: US 8,321,856 B2
(45) Date of Patent: Nov. 27, 2012

(54) SUPPLYING SOFTWARE UPDATES SYNCHRONOUSLY

(75) Inventors: Ulrich Auer, Hockenheim (DE);
Hans-Juergen Hennrich, Gaiberg (DE);
Ralf-Juergen Hauck, Heidelberg (DE);
Ralf Belger, Ludwigshafen (DE)

(73) Assignee: SAP AG, Walldorf (DE)

( * ) Notice: Subject to any disclaimer, the term of this patent is extended or adjusted under 35 U.S.C. 154(b) by 1082 days.

(21) Appl. No.: 12/233,500

(22) Filed: Sep. 18, 2008

(65) Prior Publication Data

US 2010/0070961 A1    Mar. 18, 2010

(51) Int. Cl.
*G06F 9/44* (2006.01)
(52) U.S. Cl. ........................ 717/169; 717/168
(58) Field of Classification Search ............ 717/168, 717/169
See application file for complete search history.

(56) References Cited

U.S. PATENT DOCUMENTS

| | | | |
|---|---|---|---|
| 7,415,707 B2* | 8/2008 | Taguchi et al. | 717/174 |
| 7,725,891 B2* | 5/2010 | Demuth et al. | 717/168 |
| 2003/0130985 A1 | 7/2003 | Driesen et al. | |
| 2005/0050121 A1* | 3/2005 | Klein et al. | 708/250 |
| 2005/0071385 A1* | 3/2005 | Rao | 707/200 |
| 2007/0143795 A1* | 6/2007 | Tran | 725/46 |

* cited by examiner

*Primary Examiner* — Wei Zhen
*Assistant Examiner* — Lanny Ung
(74) *Attorney, Agent, or Firm* — Mintz Levin Cohn Ferris Glovsky and Popeo, PC

(57) ABSTRACT

The subject matter disclosed herein provides methods and apparatus, including computer program products, for providing software updates. In one aspect there is provided a method. The method may include receiving software objects associated with a software update. Moreover, a container may be provided. The container may include the received software objects and attributes. The attributes may describe the software objects to configure transport to different applications. Related systems, apparatus, methods, and/or articles are also described.

20 Claims, 5 Drawing Sheets

SUPPLYING SOFTWARE UPDATES SYNCHRONOUSLY

FIELD

This disclosure relates generally to data processing and, more particularly, to supplying software updates.

BACKGROUND

It is increasingly common for a system to operate not alone, but as part of a more complex system landscape. Indeed, business processes currently run on systems of dissimilar types. Moreover, the software to configure these systems, like the business processes they support, change frequently—resulting in frequent, if not continuous updates to accommodate changing business processes, software bug fixes, new functionality, and the like. When a change is disseminated for implementation at these systems, the parts of the software update have to be activated synchronously on the systems spanned by a business process, and the proper software version of the software update has to be disseminated as well to avoid issues (e.g., problems) during the subsequent execution of the update. The process associated with updating software in disparate, software systems is, at the very least, a complex and burdensome process.

SUMMARY

The subject matter disclosed herein provides methods and apparatus, including computer program products, for providing software updates.

The subject matter disclosed herein provides methods and apparatus, including computer program products, for providing software updates. In one aspect there is provided a method. The method may include receiving software objects associated with a software update. Moreover, a container may be provided. The container may include the received software objects and attributes. The attributes may describe the software objects to configure transport to different applications.

Articles are also described that comprise a tangibly embodied machine-readable medium (also referred to as a computer-readable medium) embodying instructions that, when performed, cause one or more machines (e.g., computers, etc.) to result in operations described herein. Similarly, systems (e.g., a computer system) are also described that may include a processor and a memory coupled to the processor. The memory may include one or more programs that cause the processor to perform one or more of the operations described herein.

The above methods, articles, and systems may, in some implementations, further include one or more of the following features. The container may be generated (e.g., by attaching at least one of the software objects to the container). The generated container may include the received software objects and attributes. The attributes may describe the software objects used to configure different applications. The software objects may be transported, based on the attributes, through a base system, wherein the provided container is deployed to a node of at least one of a base system and another system. The container may be stored in the base system by logging whether at least one of the software objects is included in the container. The provided container may be deployed at a node by extracting the software objects and attributes from the container. The software objects may include one or more of the following: a software patch, a configuration file, an updated program, a change in a structure of a database table, a change in a content of the database table, and a change in a content of a web server, wherein at least one of the software objects are transported, based on attributes, through a base system, and wherein the provided container is imported into a node of at least one of a base system and another system. The base system may be an ABAP system, and the other system may be a non-ABAP system, wherein the container includes a parameter having a true value when the container is for a non-ABAP system and a false value when the container is for an ABAP system. At least one of the attributes may represent a purpose of an application type of the software object. The purpose may enable one or more nodes to identify an application to be upgraded by the container. The transport manager may provide (e.g., via one or more predetermined routes selected based on the attributes) the container to at least one of a development system, a quality assurance system, and a production system. The transport manager may manage the generated containers and routes to a development system, a quality assurance system, and a production system. The transport manager may perform one or more of the following: stores transport route between systems, imports the container, and provides a workflow. The attributes may include one or more of the following: an application type, a sub-application type, a component name, a vendor, version information, and a table of contents, wherein the attributes are used to control deployment of the container. The attributes may be configured into a hierarchy including an application type and a sub-application type to further describe the application type.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWING

These and other aspects will now be described in detail with reference to the following drawings.

Like reference symbols in the various drawings indicate like elements.

DETAILED DESCRIPTION

Figure 1:
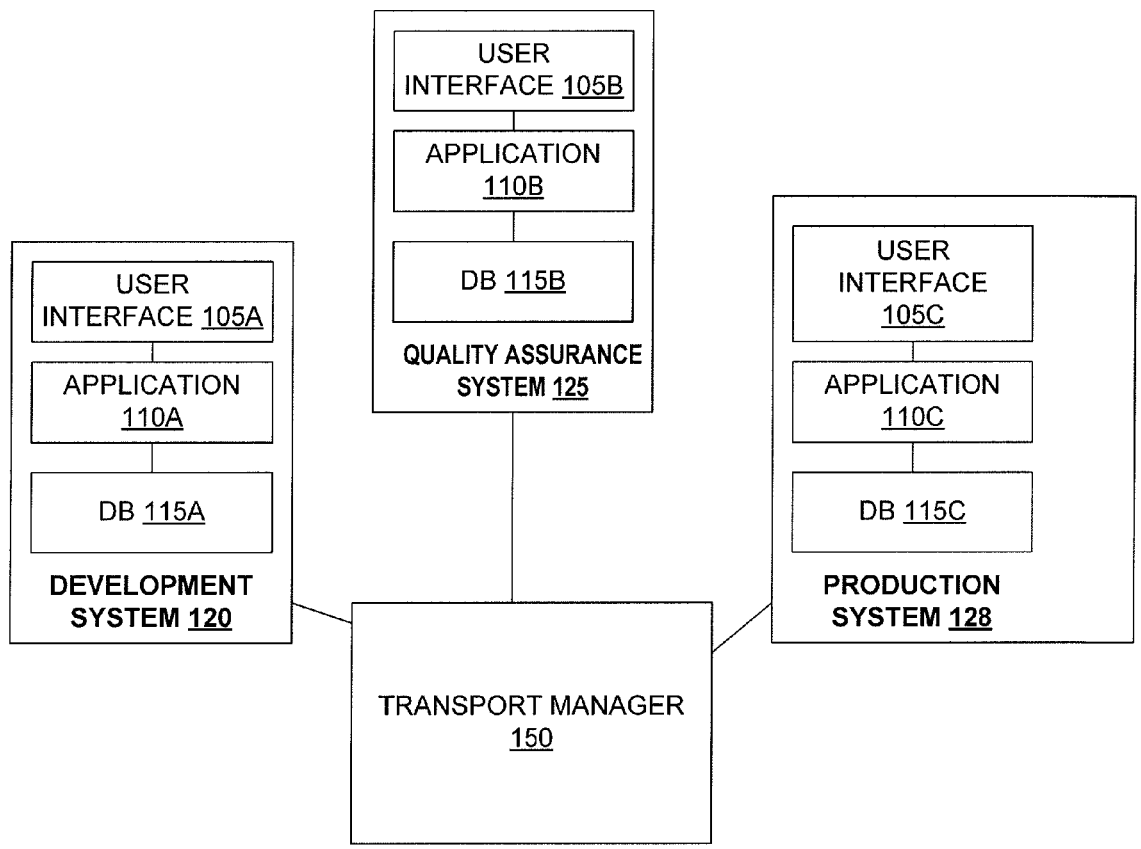
FIG. 1 illustrates a system for supplying software updates.

FIG. 1 depicts a system landscape 100 including a development system 120, a quality assurance system 125, a production system 128, and a transport manager 150. System landscape 100 depicts a three-tier framework used to develop, test, and deploy computer-implemented software, although other frameworks may be used as well. For example, the subject matter described herein may be used to update software in any system including software of different types.

The development system 120 further includes a user interface 105A, one or more applications 11A, and a database 115A, all of which are coupled by a communication mechanism, such as an intranet or the Internet. User interface 105A may be implemented as any type of interface mechanism for a user, such as a web browser, a client, a smart client, and any other presentation mechanism. Database 115A (labeled "DB") may be implemented as any type of database.

The one or more applications 110A may be implemented as any type of program. Moreover, one or more of these applications 110A may be undergoing a so-called "update." The term "update" refers to changes or additions to programs (e.g., applications, operating systems, data, and the like) used at systems 120-128. For example, an update can provide a revision to software and data, both of which are associated with an application at one or more of the systems 120-128. The updates may be in the form of a software object comprising at least one of software and data. For example, the software object may include one or more of the following: a software patch, a configuration file, an updated (e.g., new, revised, etc) program, a change in the structure of database tables, a change in the content of database tables, a change in the content of a web server (portal), and the like.

Moreover, in some embodiments, the software objects are included in a container (also referred to as a "transport request," "transport container," or a "request") and provided (e.g., sent or stored) to a target node, such as an application being updated, via a transport route (which is a path within system 100). The container has a unique identifier (e.g., a transport request number), attributes relevant for the distribution (e.g., transport to a target node via a transport route), and a physical persistence (e.g., in the file system) containing the unique identifier, the attributes, and the content (e.g., the software objects of the upgrade). The physically persisted container is thus self-describing as it has the components of the upgrade and information to configure transport to a node being upgraded. Moreover, the attributes included in the container may be used to deploy the software objects (which are associated with the software upgrade) to the application (or application server) being upgraded. The term "container" refers to an object that holds other objects, and can hold zero or more embedded components, such as software objects and attributes. For example, the user interface 105A may be used to identify one or more software objects for inclusion in the container. Once the software objects are identified, the software objects may be associated with a container (as described further below) sent via transport manager 150 (which is further described below) to other systems and corresponding applications in those systems (e.g., to applications at quality assurance system 125 for testing of the update and production system 128 for subsequent production deployment of the update).

The applications 110A-C may be of different types. For example, the applications may be of different types because of the use of different underlying technologies. Specifically, the applications may be implemented using technologies such as ABAP (commercially available from SAP AG), J2EE (Java Enterprise Edition, commercially available from Sun Microsystems and from SAP AG), XI (exchange infrastructure, commercially available from SAP AG, Walldorf, GE), and web services. When applications are developed using a single type of technology, transporting updates to a correct application via transport routes is a relatively straightforward mechanism. However, the use of different types of applications presents an integration challenge. Specifically, the transport manager 150, which manages the software update and routes the updates to a target destination may determine, regardless of application type, how and where to route the software update to the correct application(s). For example, if a software update includes a configuration file update to an ABAP file and a software patch to a J2EE application, these two software updates would each be packed in a container with associated attributes describing the application type. In some embodiments, the transport manager 150 may be implemented as a software change and transport management system, such as SAP's ABAP change and transport system configured to operate using the subject matter described herein.

In some embodiments, the types of attributes are predetermined, so that transport manager 150 can determine how to properly handle the software update. The attributes types may include one or more of the following: an application type for describing the technology of an application (e.g., J2EE, ABAP, XI, web portal, web service, and the like); a sub-application type for further describing the technology of the application (e.g., J2EE-application, J2EE-webdynpro, XI-directory, XI-repository, portal-application, portal-content, portal-KM, and the like); a component name for identification of the software components; a vendor identifier for identifying a provider of the application (e.g., SAP, etc.); a version identifier for describing the particular version of the application; and a table of contents for describing the one or more components with the application.

The component name, vendor, and version are attributes of the software component (which may be included in the container). The application type and sub-application type are set when the software object is added to the container by a manual (e.g., using a user interface to assign the application and the sub-application type to the software object) or an automated process (e.g., using a script to programmatically map the application and the sub-application type to the software object). For example, when a user has software objects for an update, the user may access a user interface provided by transport manager 150. Next, the user may identify a software object and then provide one or more attributes for that software object. For example, a user may receive an ABAP configuration file as the software object for the update and then manually select one or more one or more attributes (e.g., select at a user interface from one or more attribute types presented by the user interface for the ABAP configuration file).

The attributes, specifying a sub-system type of a transport landscape node that should be used for the import of the software object(s), are the application type and the sub-application type. Other attributes like component name, component vendor, and version are evaluated during the deployment process by a software object deployment handler of the corresponding target sub-system. For example, the application (e.g., J2EE) and application type (e.g., J2EE-application) may be used to identify a node (e.g., a server, etc.), which may be upgraded using the software objects of the components. The container is transported to the node (e.g., the server). Next, a deployment manager at the node (which is being upgraded) may use the application and application type (e.g., J2EE-application) to identify which applications at the node are candidates for the upgrade. Moreover, the deployment manager may also check if the corresponding software objects included in the container are already deployed. For example, the vendor name and name of the software object may be used to determine whether the software upgrade (included in the container) has already been deployed at a node. If deployed, the deployment handler checks if the already deployed version of the software object at the node is lower or higher by comparing the version attribute (e.g., if a higher version is already deployed at the system, then the software object might not be deployed).

Quality assurance (QA) system 125 further includes a user interface 105B, one or more applications 110B, and a database 115B, all of which are coupled by a communication mechanism, such as an intranet or the Internet. User interface 105B, applications 110B, and database 115B may be implemented as described above with respect to user interface 105A, applications 110A, and database 115A. The quality assurance system 125 is further coupled, via a communication mechanism, to transport manager 150, and has access to an interface at, for example, transport manager 150. The interface is accessed to execute transport requests (also referred to as containers) from and to the quality assurance system 125.

Production system 128 further includes a user interface 105C, one or more applications 110C, and a database 115C, all of which are coupled by a communication mechanism, such as an intranet or the Internet. User interface 105C, applications 110C, and database 115C may be implemented as described above with respect to user interface 105A, applications 110A, and database 115A. The production system 128 is further coupled, via a communication mechanism, to transport manager 150, and has access to an interface at, for example, transport manager 150. The interface is accessed to execute, for example, containers from and to the production system 128.

Transport manager 150 may be implemented as one or more data processors, such as a server, computer, blade, and the like, and may include a so-called "transport layer" of software to manage and route containers including software updates (packaged in a container with software objects). Moreover, transport manager 150 manages software updates including the proper routing of software updates to a corresponding application. For example, the transport manager 150 may be used to organize, perform, and monitor containers between systems 120-128. Specifically, transport manager 150 may perform one or more of the following: configure the transport routes (e.g., paths) between systems 120-128; display the import queues (e.g., containers including software objects waiting to be routed and disseminated to a node, such as a target system or an application); import requests (e.g., containers) in an import queue; import all the requests in a project (e.g., a plurality of containers associated with a software update); import a specific container; provide quality assurance; and provide a workflow (e.g., route and deploy to application 110B and, when testing is complete, route and deploy to application 110C). In some embodiments, the transport manager 150 may be implemented as part of an ABAP transport and change system (commercially available from SAP AG), although transportation manager 150 may be implemented in other ways as well. The transport manager 150 may also include persistency, such as memory or storage, for the containers, software objects, and the like. Moreover, although FIG. 1 depicts the transport manager 150 as separate from systems 120-128, the transport manager 150 may be distributed across one or more of the systems 120-128.

In some implementations, a developer may use development system 120 to generate software updates by developing the updates (e.g., using user interface 105A to identify and/or generate which software objects will be part of the container to provide a software update to applications and systems). Once developed, the user may access an interface at the transport manager 150 to execute a container for routing the generated software updates to the correct systems and/or applications. For example, the transport manager 150 may generate a transport route between development system 120, which includes a container having software objects, and quality assurance system 125, where the update comprising software objects is tested. When testing is complete, the user may access an interface at the transport manager 150 to indicate that testing is complete. In response, the transport manager 150 may generate a transport route between quality assurance system 125, which includes a container having software objects, and the production system 128. The container is thus sent via the transport route. The production system 125 represents the final, so-called "live" system on which the generated software updates will be deployed and thus executed.

Figure 2:
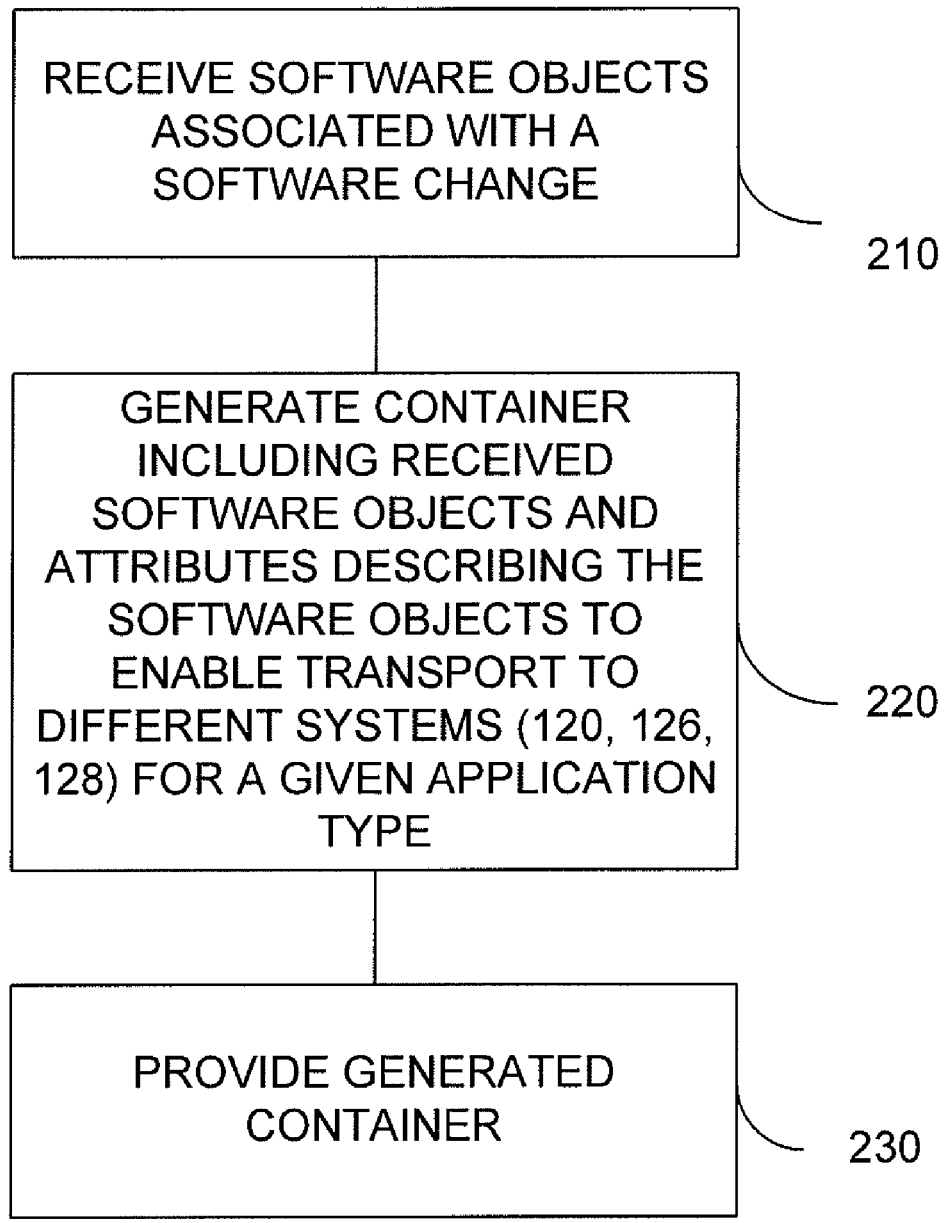
FIG. 2 illustrates a process for handling software updates.

FIG. 2 depicts a process 200 for supplying software updates to a plurality of disparate types of applications. The description of process 200 will also refer to FIGS. 1 and 3.

At 210, a software object associated with a software update is received. For example, a user of user interface 105A may generate (e.g., develop, identify, collect, or the like) one or more software objects associated with a software update, and that generated software object(s) may be received at, for example, the transport manager 150 (or an interface of the transport manager). For example, the software objects may include a configuration file for a J2EE application and a software upgrade for a .Net application. Both of these applications may be implemented as applications 110A-C. When these software objects are ready to be deployed as a software update, an interface (e.g., application programming interface or a web service interface) is accessed to execute the update. For example, the interface may be accessible at transport manager 150. The interface may also be implemented as a generic software change management system interface or as a vender-specific interface (e.g., specific to the type of application). As noted above, examples of software objects include software patches, software updates, files, configuration files, and the like.

At 220, a container is generated. The generated container includes the received software objects and corresponding attributes describing the software objects the containers may be generated manually (e.g., using a user interface to select software objects and attributes) or programmatically (e.g., using a script to map attributes to software objects). Transport routes and applications are defined generally before transport. Routes are between transport nodes. A transport node can contain one or several systems. Each system may include several application types of sub-application types. The transport manager 150 uses the attributes of the container to determine (given a defined system landscape), which system and application, at the system, receives the software objects. The system landscape may be defined either manually or programmatically by defining paths (e.g., transport routes) between transport nodes, defining systems and corresponding attributes, defining applications and corresponding attributes, and defining sub-application types. The defined system landscape may be persisted at transport manager 150.

For example, given software objects including a configuration file for a J2EE application and a software upgrade for a .Net application, transport manager 150 may use the attribute information to determine that a portion of the container should be routed to a J2EE application located at the quality assurance system 125 (e.g., one of applications 110B) and that another portion of the container should be routed to a Net application located at the quality assurance system 125 (e.g., another one of the applications 110B). Specifically, the transport manager 150 may use the application type to generally determine the application and the sub-application type to more precisely identify the application at a node. Moreover, the additional attributes, such as component name, vendor, version information, table of content, may also be used to more precisely locate which application(s) should received the software objects associated with a software update. These additional attributes may, in some implementations, be provided by a user using a user interface when the container is deployed at a node including applications being upgraded.

At 230, the container including software objects and attributes are provided to, for example, one or more applications at systems 120, 125, 128. The transport manager 150 may then send the generated container to a system, such as the quality assurance system 125, so that the software objects can be provided to the corresponding applications. In some embodiments, the generated container is sent as a container, described further with respect to FIG. 3. Moreover, in some embodiments, the transport manager 150 includes a workflow manager for managing the workflow between systems and applications. When that is the case, transport manager 150 (or the workflow manager therein) provides the generated container to the quality assurance system 125, prompts for completion of quality assurance (e.g., testing), and then provides the generated container (including any additional software objects which may have been generated at quality assurance system 125) to production system 128 and the corresponding applications 110C for deployment and use.

Figure 3:
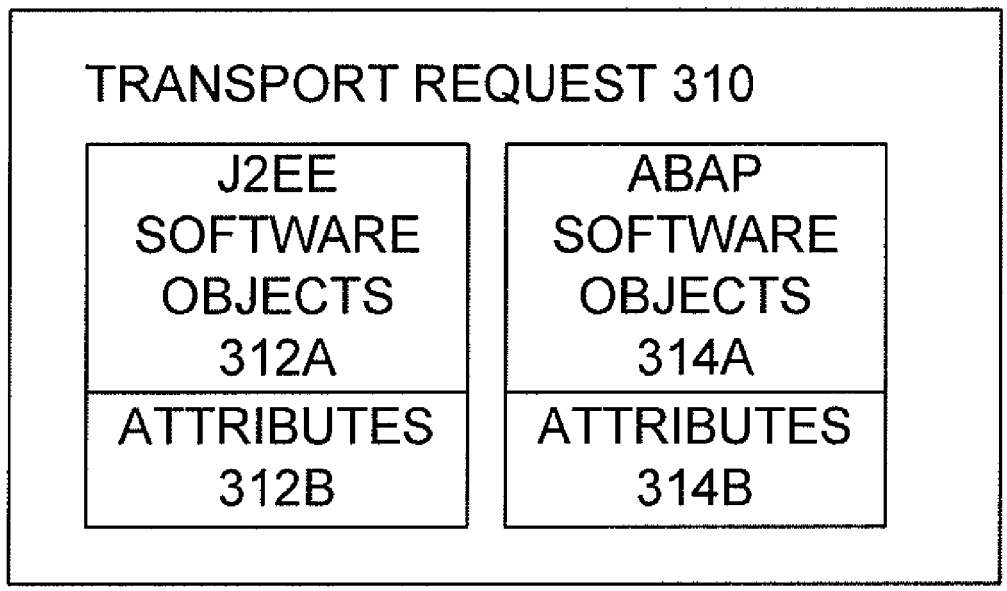
FIG. 3 depicts an example of a transport request (also referred to as a container) 300.

FIG. 3 depicts an example of a container (labeled transport request 300). The container may be processed by transport manager 150 to determine (e.g., select) transport routes between systems 120-128 and corresponding applications. Transport routes are defined as a part of the transport of the system landscape rather than being a part of the container. The container 310 includes software objects for a J2EE application (labeled J2EE software objects 312A) and corresponding attributes 312B describing those J2EE software objects. The container 310 also includes software objects for an ABAP application (labeled ABAP software objects 314A) and corresponding attributes 314B describing those ABAP software objects. The attributes 312B and 314B may include one or more of the attributes described above. Although FIG. 3 depicts a single container 300 including both ABAP software objects 314A and J2EE software objects 312A, a plurality of containers may be used as well. For example, a container may be used for ABAP software objects 314A and attributes 314B, while another container is used for J2EE software objects 312A and attributes 312B.

Figure 4:
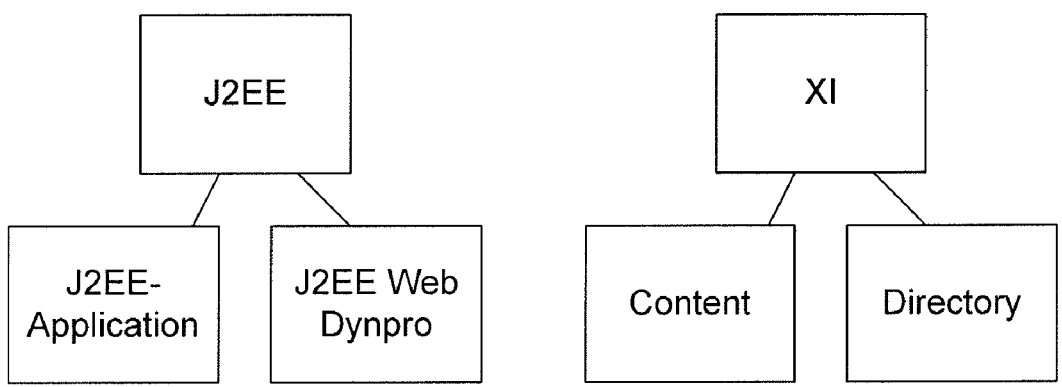
FIG. 4 depicts an example attribute hierarchy for describing software objects included in a transport request.

In some implementations, the attributes form a hierarchy, as depicted at FIG. 4. For example, the "application-type" is at the top-level of the hierarchy, such as J2EE, XI, portal, .NET, ABAP, and the like. The second level of the hierarchy is the "sub-application-type," such as application, Web Dynpro, both of which are specific types of J2EE applications. This allows specifying more precisely what software needs to be deployed on a certain server. For example, a system implementation may include a J2EE application, containing business methods and a user interface (UI) layer (e.g., Web Dynpro). The productive system includes two J2EE—servers. Thus, a user can define that all UI components should be running on one J2EE server, and the business applications on the other server. The transport would support the user deploying the needed components to the exact server via a predefined transport route.

Figure 5:
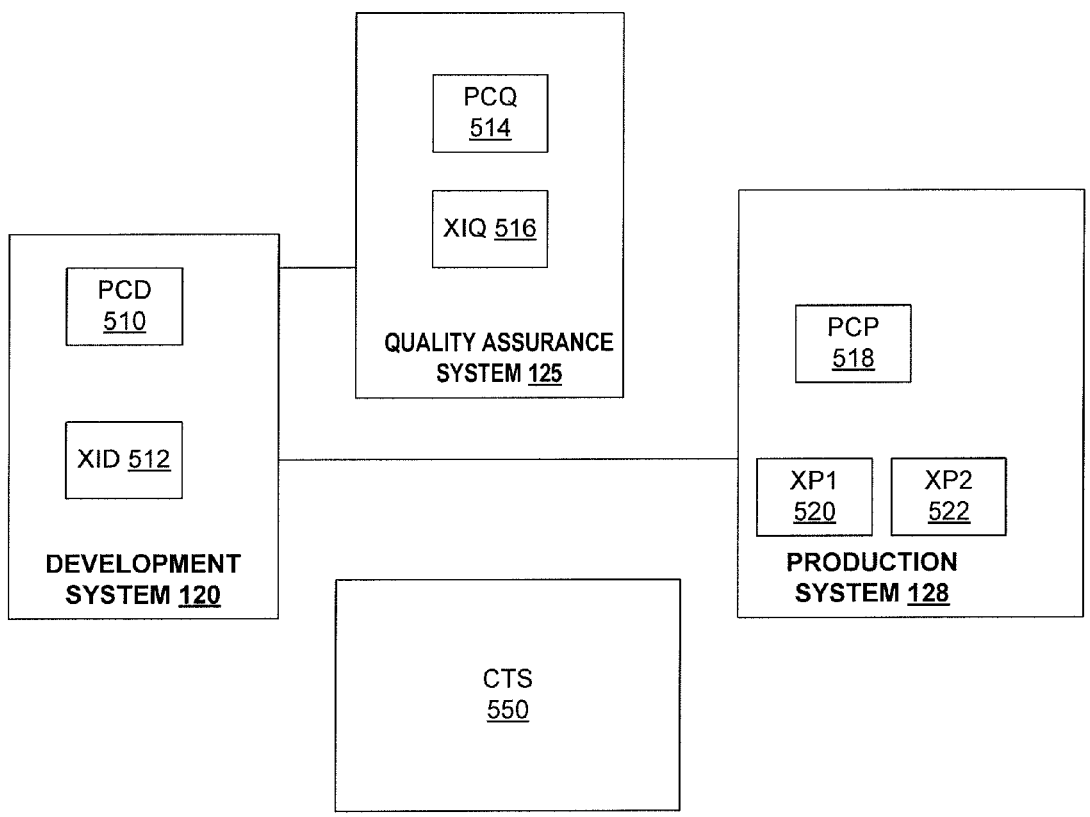
FIG. 5 depicts another system for supplying software updates.

FIG. 5 depicts a customer landscape, such as system 500. System 500 includes transport nodes, such as development system 120, quality assurance system 125, and production system 128. The systems 120-128 are similar to the corresponding systems of FIG. 1 but are configured to include portals (labeled PCD 510, PCQ 514, and PCP 518) and XI systems (labeled XID 512, XIQ 516, XP1 520, and XP2 522). Moreover, system 500 includes an ABAP change and transport system (CTS) 550, which is similar to the transport manager 150 but configured to operate in accordance with ABAP. The CTS 550 is coupled to development system 120, quality assurance system 125, and production system 128 to enable transport of a container including software objects and attributes.

In some implementations, a developer prepares a change in the XI and portal of development transport node 120. As depicted at FIG. 5, the developmental transport node 120 includes a portal (labeled PCD 510), where portal content is developed and a XI system (labeled XID 512), where XI repository and directory content is developed. The changes to the XI and portal are exported into software objects, such as files, and attached to a container.

In the following example, there are three files representing the following: changes in the content of the portal (e.g., application type is "portal" and sub-application type is none); changes in the XI repository (e.g., application type is "XI" and sub-application type is "repository"); and changes in the XI directory (e.g., application type "XI" and sub-application type is "directory"). In this example, the container (also referred to as a transport request) includes the changes (e.g., files including the changes) and attributes (e.g., the aforementioned application types and sub-application types. Moreover, the container is forwarded (for example, via the transport mechanisms provided by CTS 550) to the transport nodes, such as quality assurance system 125 and production system 128.

In the case of quality assurance system 125, the container is imported. The quality assurance system 125 includes a portal system (labeled PCQ 514) and one XI system (labeled XIQ 516), which is configured to receive content of sub-application types "repository" and "directory." The portal content files are deployed to the portal system (i.e., PCQ 514) according to its application type. The XI repository file and the XI directory file are deployed to the XI system (e.g., XIQ 516) according to their application type.

In the case of production system 128, it includes a portal system (labeled PCP 518) and two XI systems (labeled XP1 520 and XP2 522). XP1 520 is configured to receive content of sub-application type "repository," and XP2 522 is configured to receive content of sub-application type "directory." The portal content files are deployed to the portal system PCP 518 according to its application type. The XI repository file is deployed to the XI system XP1 520 according to its application type and sub-application type. The XI directory file is deployed to the XI system XP2 522 according to the application type and sub-application type.

The above description of FIG. 5 represents a so-called "node view" of system 500. In the node view, each node represents one or more systems (e.g., servers, applications, applications servers, and the like) of the same type or of a different type (e.g., all servers of a company in Australia are one node including three portal servers, two ABAP servers, and one web server). Moreover, a second view is used to distinguish between two classes of servers (e.g., the ABAP servers that represent nodes and the communication infrastructure for transport of the software updates, and the non-ABAP server that may receive updates). Furthermore, this node view and second view can be considered a two-step process. First, a node is determined by the communication infrastructure servers (e.g., CTS 550 including ABAP servers) and the container is routed to a node based on the attributes of the container (e.g., the application type and application sub-type). Second, the purpose of the application type and sub-application type is used to determine the correct system(s) at the node to update (e.g., whether an ABAP server or a J2EE server at a node should be updated). Indeed, the ability to transport a container (which includes the software objects of the update) over a base system, such as the CTS 550, and then deploy the software objects to different systems (e.g., non-ABAP systems, such as a J2EE engine) enables an asynchronous deployment of software updates. In some cases, a third step is used, wherein a user interface is implemented to provide additional attributes, such as vendor, version, and the like. This additional attribute information may be used to decide if the update is already implemented in the determined system. This third step may not contribute to the routing of the container including the update.

In some embodiments, the system 100 includes ABAP-based applications. When this is the case, the transport manager 150 serves as a communication system supplying software updates synchronously to systems with a complex inner substructure by enabling transport mechanisms provided by ABAP to handle non-ABAP software objects. In some embodiments, ABAP containers are configured to support the above-described containers comprising software objects and attributes. Moreover, the transport routes used in ABAP are thus generalized to so-called "generic" transport routes. The transport service is based on generalized objects to provide a generic interface for a software change management system. The generalized objects include a "system" (which defines the destination system or destination application being updated), a "transport request" (which bundles the objects to be transported with their attributes), and an "import" (which imports the transport request into the transport manager 150).

To attach a software object to a container (also referred to as a transport container as well as transport request), the container may be configured to include one or more software objects and attributes, which control flow through the transport service, e.g., the transport manager 150. The transport manager 150 may provide the container, which can be loaded with software objects. In some embodiments, the content of the software object is a so-called "black box" to the transport service provided by the transport manager 150, such that the contents can include any data or software, such as a file, a stream, a blob, a serializable object, and the like. This software object can be classified by additional attributes, as described above, to control the deployment process of the software object(s) to a system. In some embodiments, distribution of the container in the transport landscape (e.g., a map of a system landscape for transport purposes, which defines transport routes between transport nodes for transport containers) is done via the transport mechanisms provided by ABAP, such as the ABAP change and transport system (commercially available from SAP AG).

A transport node refers to a source or a target for a transport container. The transport node may thus correspond to one or more systems (e.g., a file system, a J2EE server 1, a J2EE server 2, a .Net-Server, and the like). Each system (which may be identified by a system identifier) has one or more purposes (e.g., a file system, a J2EE server for applications, a J2EE server for Web Dynpro, and the like). The term purpose refers to the application type. Each purpose, in some embodiments, corresponds to a sub-application type as described above. Moreover, each system has one or more deployment channels (e.g., SAP's software deployment manager, XI-deployment client, and the like). Moreover, the software object, which is transported in the transport container, is deployed to the systems of a transport node. During a deployment, only those systems are considered which carry the same function as the application type of the software object. The deployment channel used for the deployment process is determined by attributes, such as the application type, of the software object.

In embodiments using ABAP applications, the transport system provided by ABAP (including a transport manager) can be configured as described further below. The transport management provided by ABAP can be configured to extend the transport routes to non-ABAP systems, propagate containers between non-ABAP systems, and include arbitrary data (e.g., software objects) into containers. Specifically, a transport profile parameter is implemented so that non-ABAP systems can be marked as such. In some implementations, the transport profile parameter is named "non_ABAP_system," which can have the values: true or false. Moreover, for each non-ABAP system the following information will be stored during configuration: communication system, which is a transport profile parameter defining, for each non-ABAP system, which ABAP system will provide the transport via a transport manager; connection info (e.g., URL) to the system and/or to the system's deployed service user; user identifier; and/or password.

To extend the ABAP transport manager so that software objects (described above) can be transported as a "black box," the container including the software objects and attributes are configured as any software or data, such as a file (e.g., a serialized stream of a file). This general format serves as input for a generalized transport system and serves as the format for deployment to the production system. Other than the format being a file, the ABAP transport manager imposes no other constraints about the inner structure of the file. Moreover, the ABAP transport manager, such as the transport tools, is configured by including the file into containers and deploying the file to a target system (e.g., systems 120-128). Furthermore, the file(s) may be included in a container by attaching the file to a container; copying the file into the transport directory at transport manager 150; persisting all known file attributes; and including the files and their attributes into the transport container when it is released to the target system. The files may also be deployed to a target system (e.g., systems 120-128) by extracting the files and their attributes from the transport container; propagating the files to, for example, a web service or software change management interface for deployment using the file attributes to identify the target systems and to chose suitable deployment methods; and persisting the deployment results (e.g., success, error messages, deploy log, and the like) in transport logs.

When the transport system implemented in ABAP is used as the underlying communication system to transport the software updates, for each non-ABAP system, a communication system is explicitly defined as an ABAP system. Whenever an export of software objects from a non-ABAP system or an import of software objects into a non-ABAP system takes place, the ABAP transport tools connect to the communication system's database (e.g., an ABAP database). The following functions of the ABAP transport system will thus be available to non-ABAP systems: containers as well as the files and their attributes are stored in the communication system; deployment of the files to their target systems is performed via the communication system (i.e. parts of the software are implemented in ABAP); recordings about which files belong to which containers and deployed to which target system are stored in the communication system; and displaying of transport logs via the communication system.

Moreover, in some embodiments, containers can contain more than one software object. For example, it may be beneficial to include different software objects into one container when the software objects have strong technical or semantical dependencies. As such, this one container may ensure a consistent deployment to different target systems.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" may refer to any entity including a person or a computer.

The foregoing description is intended to illustrate but not to limit the scope of the invention, which is defined by the scope of the appended claims. Other embodiments are within the scope of the following claims.

What is claimed:

1. A non-transitory computer-readable medium containing instructions to configure a processor to perform a method, the method comprising:
   receiving software objects associated with a software update; and
   providing a container including the received software objects and attributes, the attributes describing the software objects to configure transport to different applications, the attributes including an application type, a sub-application type, a component name, a vendor, a version information, and a table of contents, wherein the application type and sub-application type are arranged in a hierarchical order and set when at least one software object is added to the container, the application type forming a high level in the hierarchical order and the sub-application type forming a second level in the hierarchical order;
   wherein the transport routes and applications are defined before transport and based on the attributes.

2. The computer-readable medium of claim 1 further comprising:
   generating the container including the received software objects and attributes, the attributes describing the software objects used to configure different applications.

3. The computer-readable medium of claim 2, wherein generating further comprises:
   generating the container by attaching at least one of the software objects to the container.

4. The computer-readable medium of claim 1, wherein providing further comprises:
   transporting, based on the attributes, the software objects through a base system, wherein the provided container is deployed to a node of at least one of a base system and another system.

5. The computer-readable medium of claim 4, wherein transporting further comprises:
   storing the container in the base system by logging whether at least one of the software objects is included in the container.

6. The computer-readable medium of claim 1 further comprising:
   deploying the provided container at a node by extracting the software objects and attributes from the container.

7. The computer-readable medium of claim 1, wherein the software objects include one or more of the following: a software patch, a configuration file, an updated program, a change in a structure of a database table, a change in a content of the database table, and a change in a content of a web server, wherein at least one of the software objects is transported, based on attributes, through a base system, and wherein the provided container is imported into a node of at least one of a base system and another system.

8. The computer-readable medium of claim 7, wherein the base system is an advanced business application programming ("ABAP") system, and the other system is non-ABAP system, and wherein the container includes a parameter, the parameter having a true value when the container is for a non-ABAP system and a false value when the container is for an ABAP system.

9. The computer-readable medium of claim 1, wherein the attributes include at least one attribute representative of a purpose of an application type of the software object, the purpose enabling one or more nodes to identify an application to be upgraded by the container.

10. The computer-readable medium of claim 1, wherein providing further comprises:
    providing, by a transport manager via one or more predetermined routes selected based on the attributes, the container to at least one of a development system, a quality assurance system, and a production system.

11. The computer-readable medium of claim 2, wherein a transport manager manages the generated container and routes to a development system, a quality assurance system, and a production system.

12. The computer-readable medium of claim 1, wherein providing further comprises:
    transporting, by a transport manager, the container, the transport manager performing one or more of the following: storing transport routes between systems, importing the container for transport, and providing a workflow.

13. The computer-readable medium of claim 1, wherein the attributes are used to control deployment of the container.

14. The computer-readable medium of claim 1,
    the sub-application type further describes the application type.

15. A computer-implemented method comprising:
    receiving software objects associated with a software update; and
    providing a container including the received software objects and attributes, the attributes describing the software objects to configure transport to different applications, the attributes including an application type, a sub-application type, a component name, a vendor, a version information, and a table of contents, wherein the application type and sub-application type are arranged in a hierarchical order and set when at least one software object is added to the container, the application type forming a high level in the hierarchical order and the sub-application type forming a second level in the hierarchical order;

wherein the transport routes and applications are defined before transport and based on the attributes.

16. The computer-implemented method of claim 15 further comprising:

generating the container including the received software objects and attributes, the attributes describing the software objects used to configure different applications.

17. The computer-implemented method of claim 16, wherein generating further comprises:

generating the container by attaching at least one software objects to the container.

18. A system comprising:

a processor; and a memory, wherein the processor and the memory are configured to perform a method comprising:

receiving software objects associated with a software update; and providing a container including the received software objects and attributes, the attributes describing the software objects to configure transport to different applications, the attributes including an application type, a sub-application type, a component name, a vendor, a version information, and a table of contents, wherein the application type and sub-application type are arranged in a hierarchical order and set when at least one software object is added to the container, the application type forming a high level in the hierarchical order and the sub-application type forming a second level in the hierarchical order;

wherein the transport routes and applications are defined before transport and based on the attributes.

19. The system of claim 18 further comprising:

generating the container including the received software objects and attributes, the attributes describing the software objects used to configure different applications.

20. The system of claim 19, wherein generating further comprises:

generating the container by attaching at least one software objects to the container.

* * * * *